United States Patent [19]

Sugahara

[11] Patent Number: 5,388,777
[45] Date of Patent: Feb. 14, 1995

[54] SPINNING REEL WITH IMPROVED CONTROL STRUCTURE OF STOPPER MECHANISM

[75] Inventor: Kenichi Sugahara, Sakai, Japan
[73] Assignee: Shimano Inc., Osaka, Japan
[21] Appl. No.: 5,555
[22] Filed: Jan. 19, 1993

[30] Foreign Application Priority Data

Jan. 22, 1992 [JP] Japan .............. 4-001715[U]

[51] Int. Cl.⁶ ........................... A01K 89/027
[52] U.S. Cl. ................... 242/247; 188/82.3; 242/300
[58] Field of Search ............... 242/247, 248, 299, 300; 188/82.4, 82.3, 82.31, 82.32, 82.33, 82.34

[56] References Cited

U.S. PATENT DOCUMENTS

| | | | |
|---|---|---|---|
| 4,087,058 | 5/1978 | Yamasaki et al. | 242/300 |
| 4,208,020 | 6/1980 | Gifford | 242/248 |
| 4,340,189 | 7/1982 | Volkert et al. | 242/300 |
| 4,359,197 | 11/1982 | Neufeld | 242/300 |
| 4,408,728 | 10/1983 | Pittman | 242/300 |
| 4,919,361 | 4/1990 | Kobayashi | 242/247 |
| 4,923,141 | 5/1990 | Sazaki et al. | |
| 5,042,741 | 8/1991 | Aota | |
| 5,221,057 | 6/1993 | Yoshikawa | 242/247 |

FOREIGN PATENT DOCUMENTS

| | | |
|---|---|---|
| 4-28699 | 1/1990 | Japan . |
| 2246059 | 1/1992 | United Kingdom . |
| 2248162 | 4/1992 | United Kingdom . |
| 2254534 | 10/1992 | United Kingdom . |

*Primary Examiner*—Katherine Matecki
*Attorney, Agent, or Firm*—Dickstein, Shapiro & Morin

[57] ABSTRACT

A spinning reel comprising a reel body, a rotary frame mounted forwardly of the reel body and attached to a sleeve shaft to be rotatable in unison therewith, and a stopper mechanism having engaging teeth and an engaging pawl for preventing the rotary frame from rotating in a fishing line feeding-out direction. The engaging teeth are defined in inner peripheries in a recess portion defined in the rotary frame, while the engaging pawl is mounted forwardly of the reel body. The spinning reel further comprises a selector mechanism having a selector control element, a selector control shaft, and a link operating member. The selector mechanism is operable to select between a rest position to maintain the engaging pawl in a position away from said engaging teeth and an operative position to selectively move the engaging pawl between a position to engage said engaging teeth and a position to disengage from the engaging teeth. The selector control shaft is interlocked with the selector control element to drive the engaging pawl, and the link operating member is operable to transmit an operating force of the selector control shaft to the engaging pawl.

16 Claims, 6 Drawing Sheets

5,388,777

SPINNING REEL WITH IMPROVED CONTROL STRUCTURE OF STOPPER MECHANISM

BACKGROUND OF THE INVENTION

1. Field of the Invention

The present invention relates to spinning reels, and more particularly to spinning reels comprising a stopper mechanism for preventing reverse rotation of a rotary frame in a fishing line feeding-out direction and a selector mechanism for selectively moving the stopper mechanism between an operative position and an inoperative position.

2. Description of the Related Art

An example of control structures in conventional stopper mechanisms of reels is shown in Japanese Utility Model Publication No. 55-38379, which includes a stopper mechanism having engaging teeth attached to a spool shaft to be rotatable in unison with a rotary frame, and an engaging pawl mounted forwardly of a reel body. A selector mechanism includes a selector control member mounted rearwardly of the reel body and a selector control shaft longitudinally extending through and projecting forwardly of the reel body. The selector control shaft defines an operative portion on a forward end thereof for acting upon the engaging pawl.

However, according to the conventional structures as noted above, the selector control shaft directly acts on the engaging pawl, which requires that the operative portion cooperating with the engaging pawl of the control shaft is positioned close to the engaging pawl. As a result, the positional arrangement of the components is strictly limited.

In particular, since a number of elements has to be arranged in a small space in reels, the restriction of the parts arrangement reduces the degree of freedom in the design.

SUMMARY OF THE INVENTION

A primary object of the present invention is to provide an improved reel which can ease the restriction of the parts arrangement by adding a new mechanism to a fixed place.

A further object of the invention is to provide an improved reel comprising a stopper mechanism automatically selecting between a rest position and an operative position in accordance with a direction of rotation of a rotary frame.

In order to fulfill the above-noted object, the present invention is characterized by a spinning reel comprising a reel body, a rotary frame mounted forwardly of the reel body and attached to a sleeve shaft to be rotatable in unison therewith, a stopper mechanism having engaging teeth defined in a rotary mechanism of the rotary frame and an engaging pawl mounted forwardly of the reel body for preventing the rotary frame from rotating in a fishing line feedingout direction, and a selector mechanism operable to select between a rest position to maintain the engaging pawl in a position to disengage from said engaging teeth and an operative position to selectively move the engaging pawl between a position to engage said engaging teeth and a position away from the engaging teeth, said selector mechanism having a selector control element, a selector control shaft interlocked with the selector control element to drive the engaging pawl, and a link operating member operable to transmit an operating force of the selector control shaft to the engaging pawl.

This structure has the following functions and effects.

The link operating member allows the operating force of the selector control shaft to be transmitted to the engaging pawl, and thus it is not required that the selector control shaft and the engaging pawl are arranged close to each other.

This means that the selector control shaft and the engaging pawl can be arranged free from any limitations in arrangement with each other to utilize a space efficiently in arrangement of each component, which can ease the restrictions in manufacture and design.

Further, according to the spinning reel of the present invention, the link operating member and the engaging pawl may be operated in a plane perpendicular to an axis of the selector control shaft. This structure has the advantage that the mounting position of the engaging pawl is freely determined not only in an axial direction of the selector control shaft, but also in a direction perpendicular to the selector control shaft, which means that the degree of freedom in arrangement can be broadened to the two-dimensional direction.

Still further, the spinning reel according to the present invention may have the following structure.

A projection may be defined in an outer periphery of a cam member mounted to the rotary mechanism rotatable with the rotary frame for friction interlock. When the rotary frame rotates in one direction, the projection acts upon and lift one end of the engaging pawl thereby to select the rest position to maintain the engaging pawl engaged with the engaging teeth in a position away from the engaging teeth. On the other hand, when the rotary frame rotates in the opposite direction, the projection moves away from the engaging pawl thereby to select an operative position to allow the engaging pawl to engage with the engaging teeth.

Such a structure performs the following functions and effects.

When the rotary frame rotates in one direction, the cam member frictionally interlocked with the rotary frame is also rotated. Rotation of the cam member allows the projection of the cam member to contact the engaging pawl thereby to move the engaging pawl to the rest position. When the rotary frame rotates in the opposite direction, the cam member frictionally interlocked with the rotary frame is also rotated in the opposite direction. Rotation of the cam member allows the projection of the cam member to move away from the engaging pawl thereby to move the engaging pawl to the operative position. Thus, the position of the stopper mechanism is advantageously automatically selected only through rotation of the rotary frame.

Other objects, features and advantages of the invention will be apparent from the following detailed description referring to the accompanying drawings.

BRIEF DESCRIPTION OF THE DRAWINGS

The drawings illustrate embodiments of a spinning reel according to the present invention, in which.

DETAILED DESCRIPTION OF THE PREFERRED EMBODIMENTS

Figure 1:
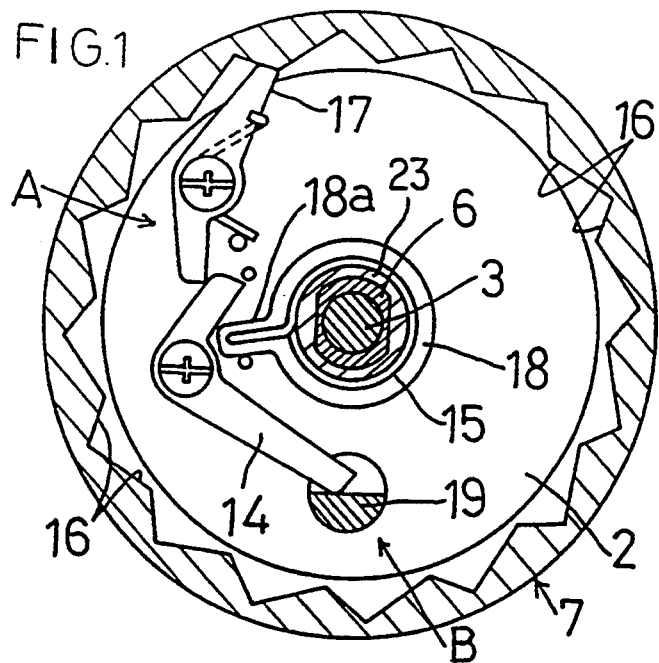
FIG. 1 is a front view in vertical section showing an engaging position of a ratchet pawl in an operative position.

A preferred embodiment of a spinning reel according to the present invention will be described in detail hereinafter referring to the drawings.

Figure 5:
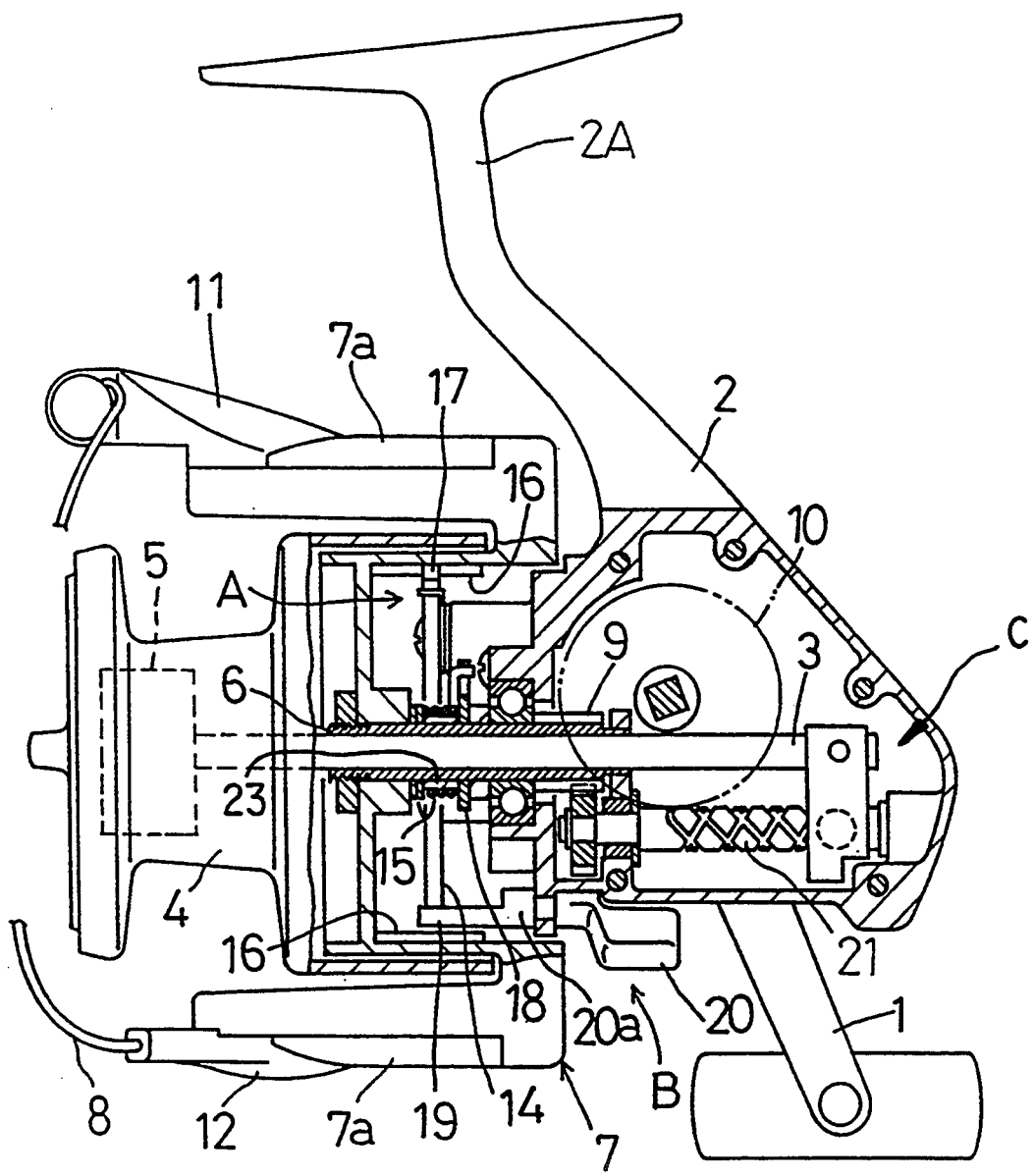
FIG. 5 is a side view in vertical section of a reel.

FIG. 5 shows a spinning reel comprising a reel body 2, a handle 1 supported by the reel body 2, a pole mount 2A extending upwardly from the reel body 2, a spool shaft 3 extending from the reel body 2, spool 4 rotatable with the spool shaft 3 through a drag mechanism 5, a sleeve shaft 6 fitted on a proximal end portion of the spool shaft 3, a rotary frame 7 mounted on the sleeve shaft 6 to be rotatable therewith, an oscillating mechanism C for reciprocating the spool 4 through rotation of the rotary frame 7, a pinion gear 9 mounted on the sleeve shaft 6 inside the reel body 2, and a main gear 10 meshed with the pinion gear 9. A fishing line is taken up to the spool by controlling the handle 1 to rotate the rotary frame 7.

The oscillating mechanism C includes a helical groove shaft 21 mounted parallel to the spool shaft 3, and an input gear mounted on a forward end of the helical groove shaft 21 and meshed with the pinion gear 9. The oscillating mechanism C causes the spool shaft 3 to axially reciprocate with the spool 4 as the fishing line is would up.

Figure 4:
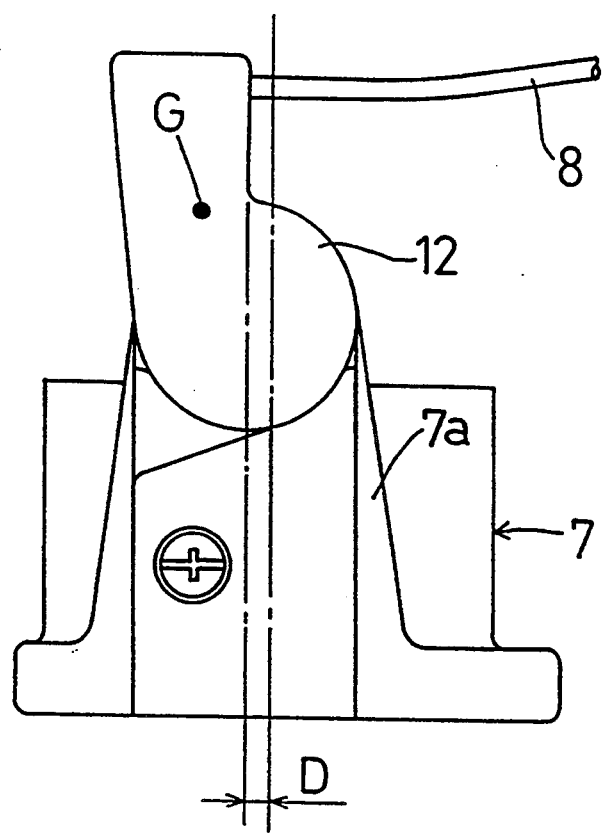
FIG. 4 is a bottom view showing a shape of a pivot arm.

A position selector mechanism of a bail arm 8 will be described next. As shown in FIG. 4, the bail arm 8 is connected at one end thereof to an arm cam 11 to be pivotable therewith. The arm cam 11 is pivotably mounted on one of support arms 7a of the rotary frame 7. The other end of the bail arm 8 is pivotably connected to the other of the support arms 7a through a pivot arm 12. One of the support arms 7a accommodates an unillustrated toggle-type urging mechanism for maintaining the bail arm 8 in either of a fishing line feeding-out position and a fishing line winding position. In such a structure, the problem of unbalance of the rotary frame 7 resulting from the projecting bail arm 8 and a shape of the arm cam 11 can be solved by the following structure.

The shape of the pivot arm 12 supporting the other end of the bail arm 8 is determined as shown. As a result, the center of gravity of the pivot arm 12 is positioned at a center of rotation of the rotary frame or at the opposite side to the bail arm 8 across the center of rotation. By determining the center of gravity in this way, the problem of unbalance which will be described later can be solved while an amount of offset of the pair of support arms 7a from the center of rotation of the rotary frame is reduced. At the same time, the weight of a balance weight mounted on a rear end of the rotary frame 7 can be decreased.

Figure 3:
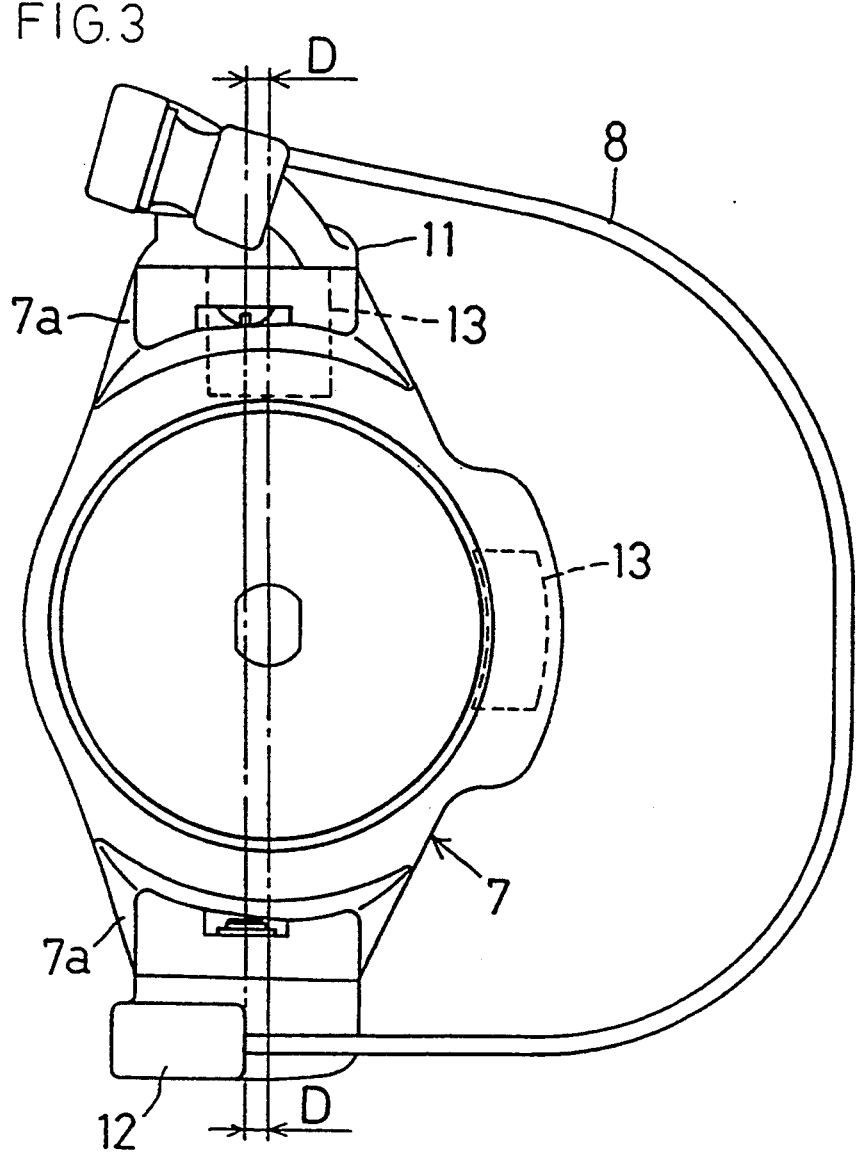
FIG. 3 is a bottom view showing arrangement of balance weights in a rotary frame.

Next, the structure for keeping the dynamic balance of the rotary frame 7 will be set forth. The bail arm 8 is made of metal or alloy having a density less than 6 g/cm$^3$. As shown in FIG. 3, the support arm 7a is offset from the center of rotation of the rotary frame 7 to the opposite side to the bail arm 8 by the amount of D. Further, in order to keep the dynamic balance axially of the spool shaft, the balance weights 13 are mounted on a proximal end portion of the support arm 7a at the rear end of the rotary frame 7 and on a bulging portion of the rotary frame 7, respectively.

A stopper mechanism A of the rotary frame 7 will be described below. As seen from FIGS. 1 and 2, the stopper mechanism A includes a recess portion defined at the rear end portion of the rotary frame 7 to extend forwardly, ratchet teeth 16 defined on an inner periphery of the recess portion and acting as engaging teeth, and a ratchet pawl 17 meshed with the ratchet teeth 16 and acting as an engaging pawl. The ratchet pawl 17 is mounted forwardly of the reel body 2 and pivotable about an axis parallel to the spool shaft 3. A spring urged in an engaging direction acts on the ratchet pawl 17. A cam member 18 having a projection 18a defined in an outer periphery thereof is mounted adjacent the ratchet teeth 16. The projection 18a lifts the ratchet pawl 17 through a link arm 14 acting as a link operating member described later to select a rest position to maintain the ratchet pawl 17 in a position away from the ratchet teeth 16.

The projection 18a is rotated to retract thereby to select an operative position to move the ratchet pawl 17 between a position to engage the ratchet teeth 16 and a position to disengage the ratchet teeth 16. The cam member 18 is rotated with the sleeve shaft 6 by a predetermined angle through a friction maintaining spring 15 wound around collar 23. Collar 23 is mounted on and rotates with the sleeve shaft 6. The cam member 18 lifts the ratchet pawl 17 as the rotary frame 7 is rotated in the fishing line winding direction, while moving the ratchet pawl 17 to the engaging position as the rotary frame 7 is rotated in the fishing line feeding-out direction.

A selector mechanism B for manually moving the ratchet pawl 17 between the rest position and the operative position will be described next.

Figure 2:
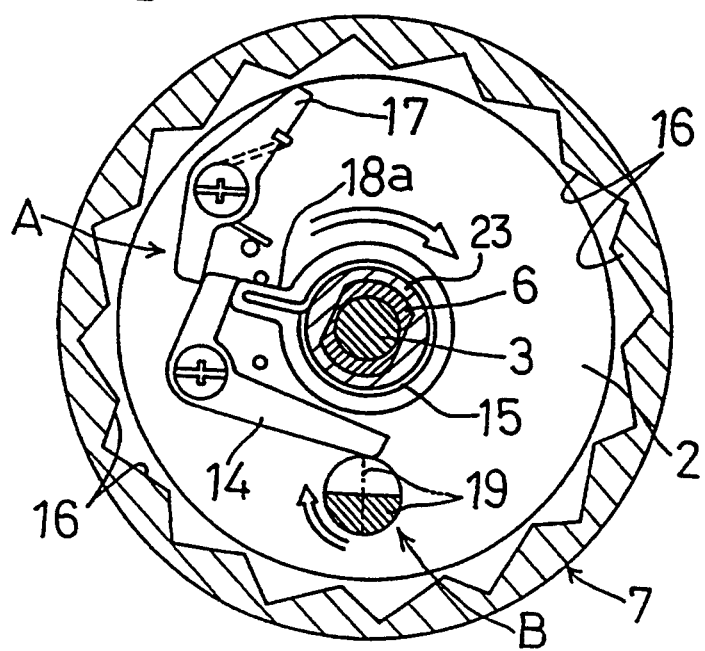
FIG. 2 is a front view in vertical section showing a disengaging position of the ratchet pawl in the operative position.

Referring to FIGS. 1, 2 and 5, the selector mechanism B includes a stopper lever 20 mounted on a bottom face of the reel body 2 and acting as a selector control member, a selector control shaft 20a mounted integrally with the stopper lever 20, a selector cam 19 disposed in an extending end of the selector control shaft 20a, and the link arm 14 receiving operation of the selector cam 19 to apply its drive to the ratchet pawl 17. The link arm 14 is mounted forwardly of the reel body 2 through a support shaft parallel to the spool shaft 3. Referring to FIG. 2, when the selector cam 19 is operated from a position as shown in solid lines to a position as shown in two-dot-and-chain lines, the selector cam 19 acts on one end of the link arm 14 to oscillate the link arm 14. The link arm 14 in turn lifts one end of the ratchet pawl 17 to move the latter to the rest position. When the stopper lever 20 is set to a position as shown in solid lines as illustrated in FIG. 1, the selector cam 19 moves away from the link arm 14, and operation of the cam member 18 changes the position of the link arm 14. Then, the ratchet pawl 17 is moved to the operative position to prevent the rotary frame 7 from rotating in the fishing line feeding-out direction and allow the rotary frame 7 to rotate in the fishing line winding direction.

Other embodiments will be set forth below.

Figure 6:
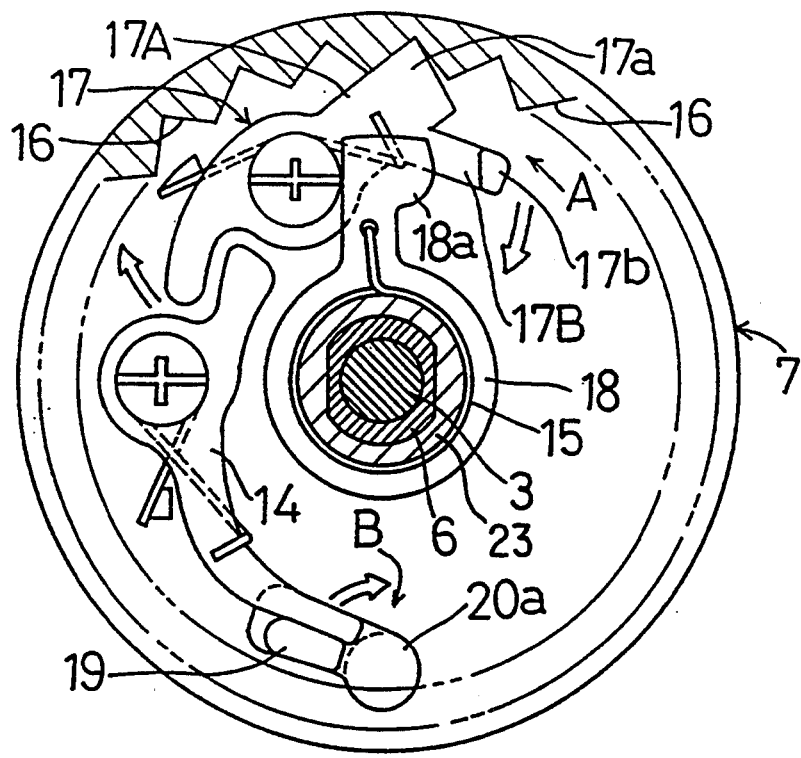
FIG. 6 is a front view in vertical section showing the engaging position of the ratchet pawl in the operative position according to a further embodiment including a stopper mechanism having ratchet teeth defined in inner peripheries of the rotary frame.
Figure 7:
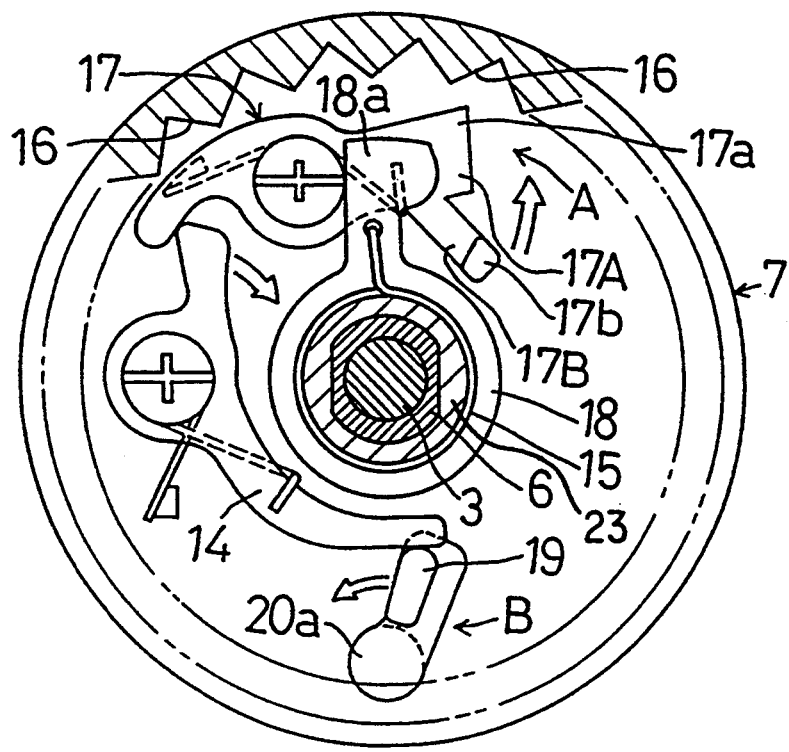
FIG. 7 is a side view in vertical section showing the ratchet pawl of FIG. 6 forcibly moved to a rest position by the stopper mechanism.
Figure 8:
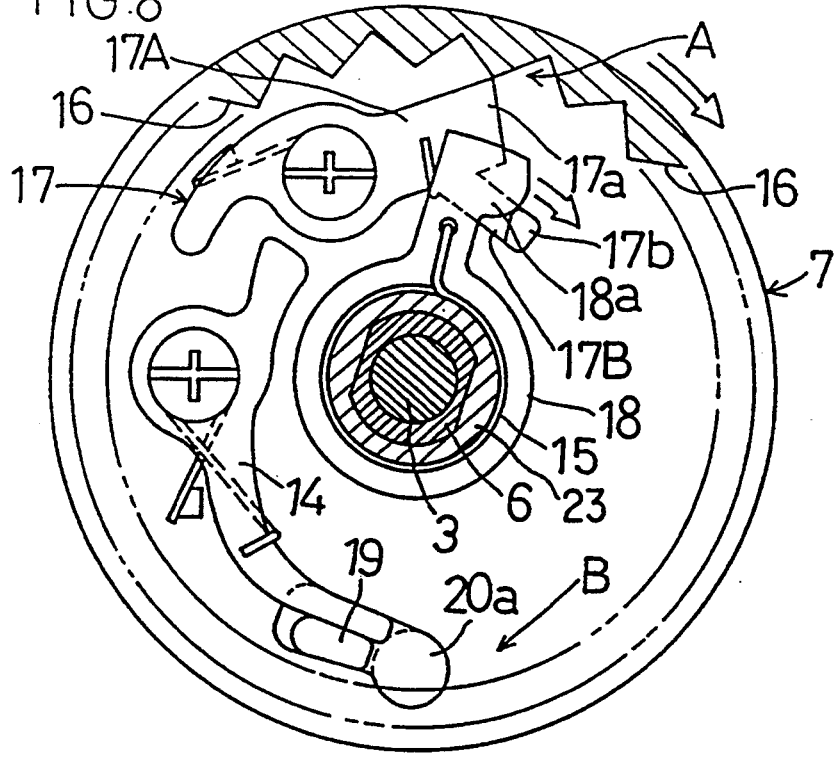
FIG. 8 is a front view in vertical section showing the ratchet pawl of FIG. 6 lifted by ratchet teeth.
Figure 9:
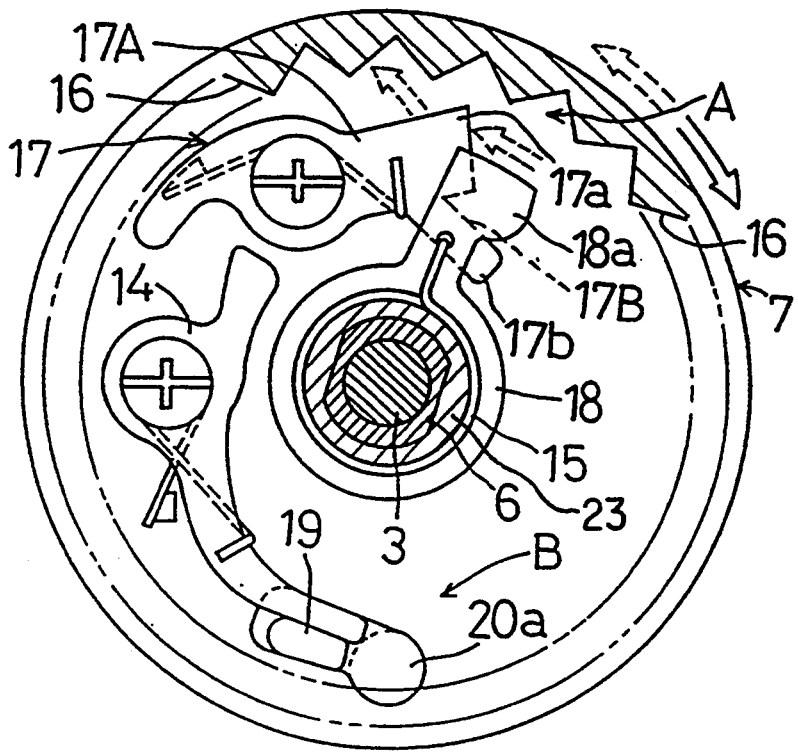
FIG. 9 is a front view in vertical section showing the ratchet pawl of FIG. 6 lifted by a cam member up to the rest position.

Referring to FIGS. 6 through 9, a stopper mechanism A includes ratchet teeth 16 defined on an inner periphery of a rotary frame 7 and acting as engaging teeth, and a ratchet pawl 17 meshed with the ratchet teeth 16 and acting as an engaging pawl. A branch portion 17B extends from a ratchet body 17A defining a pawl portion 17a, and an engaging stepwise portion 17b is defined on an extreme end of the branch portion 17B. The ratchet pawl 17 is pivotable about an axis parallel to the spool shaft 3, and a spring urged in the meshing direction acts on the ratchet pawl 17. A cam member 18 is mounted adjacent the ratchet teeth 16 and defines a cam portion 18a in an outer periphery thereof. The cam portion 18a engages the engaging stepwise portion 17b of the ratchet pawl 17 to retract the ratchet pawl 17 and select a rest position to maintain the ratchet pawl 17 in a position away from the ratchet teeth 16. The cam portion 18a is rotatably retracted, thereby to select a position to move the ratchet pawl 17 between a position to engage the ratchet teeth 18 and a position away from the ratchet teeth 16. However, the engaging stepwise portion 17b does not completely engage the cam portion 18a with the ratchet pawl 17 being engaged with the ratchet teeth 18. The complete engagement therebetween is established as follows. As shown in FIG. 8, the pawl portion 17a of the ratchet pawl 17 has such a shape as tightly contacts the configuration of the teeth with the engaging portion 17a being meshed with the ratchet teeth 16. When the rotary frame 7 is rotated in the fishing line winding direction, the ratchet pawl 17 receives a moving force of the ratchet teeth 16 to oscillate in a direction to disengage the ratchet teeth 16. After the ratchet pawl 17 has been oscillated by a predetermined angle, the cam portion 18a engages the engaging stepwise portion 17b for the first time. As a result, the ratchet pawl 17 receives a moving force of the cam member 18 and moves to the position away from the ratchet teeth as shown in FIG. 9. The cam member 18 is pivotable with the sleeve shaft 6 by a predetermined angle through a friction maintaining spring 15 wound around the sleeve shaft 6, which allows the ratchet pawl 17 to be lifted when the rotary frame 7 is rotated in the fishing line winding direction while to move to the engaging position when the rotary frame 7 is rotated in the fishing line feeding-out direction.

Another embodiment of the selector mechanism B as described above for selectively moving the engaging pawl 17 between the rest position and the operative position will be described below.

Referring to FIGS. 6 through 9, a selector mechanism B includes a stopper lever 20 mounted on a bottom face of the reel body 2 and acting as a selector member, a selector control shaft 20a mounted integrally with the stopper lever 20, and a stepwise selector cam 19 defined on an extending end of the control shaft to be engageable with one end of a link arm 14. The link arm 14 is disposed in the proximity of the selector cam 19 to apply an operating force of the selector cam 19 to the ratchet pawl 17. The link arm is mounted forwardly of the reel body through a support shaft parallel to the spool shaft 3. Referring to FIG. 7, the selector cam 19 is operated to act on the one end of the link arm 14 to oscillate the link arm 14, which allows the link arm 14 to lift one end of the ratchet pawl 17 to move the ratchet pawl to the rest position. When the stopper lever 20 is positioned as shown in FIG. 6, the selector cam 19 moves away from the link arm 14 to move the ratchet pawl 17 to the operative position under an operating force of the cam member 18. Thus, the present invention provides such a stopper mechanism A as prevents the rotary frame 7 from rotating in the fishing line feeding-out direction and allows the rotary frame 7 to rotate in the fishing line winding direction.

What is claimed is:

1. A spinning real comprising:
   a reel body;
   a rotary frame mounted forwardly of said reel body and attached to a sleeve shaft to be rotatable in unison therewith, said rotary frame including a recess having an inner periphery;
   a stopper mechanism having engaging teeth and an engaging pawl for preventing said rotary frame from rotating in a fishing line feeding-out direction;
   said engaging teeth being defined in said inner periphery,
   said engaging pawl being mounted to said reel body on a forward portion thereof, and
   a selector mechanism having a selector control element, a selector control shaft, and a link operating member, said selector mechanism being operable to select between:
   (a) a rest position wherein the engaging pawl is maintained in a position away from said engaging teeth, and
   (b) an operative position wherein the engaging pawl is selectively moved between a position to engage said engaging teeth in response to rotation of said rotary frame in a first direction and a position to disengage from the engaging teeth in response to rotation of said rotary frame in a second direction;
   wherein said selector control shaft is interlocked with said selector control element to drive said engaging pawl, and
   wherein said link operating member is operable to transmit an operating force of the selector control shaft to said engaging pawl.

2. A spinning reel as claimed in claim 1, wherein said link operating member and said engaging pawl are operable within a plane perpendicular to a longitudinal axis of said selector control shaft.

3. A spinning reel as claimed in claim 1, wherein said rotary frame includes a rotary mechanism rotatable therewith and having a cam member for friction interlock with the rotary mechanism, said cam member defining a projection in an outer periphery thereof, said rotary frame being rotated in one direction thereby to allow said projection to act on one end of said engaging pawl to lift the engaging pawl and further to establish said rest position to maintain the engaging pawl in a position to disengage from the engaging teeth, said rotary frame being rotated in the opposite direction thereby to move said projection away from said engaging pawl and further to establish said operative position to allow the engaging pawl to engage the engaging teeth.

4. A spinning reel as claimed in claim 1 wherein said rotary frame includes a rotary mechanism rotatable therewith and having a cam member for friction interlock with the rotary mechanism, said cam member defining a cam portion in an outer periphery thereof, said rotary frame being rotated in one direction thereby to allow said cam portion to act on an engaging stepwise portion of the engaging pawl to retract the engaging pawl and further to establish said rest position to maintain the engaging pawl in a position to disengage from the engaging teeth, said rotary frame being rotated in the opposite direction thereby to move said cam portion away from said engaging pawl and further to establish said operative position to allow the engaging pawl to engage the engaging teeth.

5. A spinning reel as claimed in claim 1 further comprising an oscillating mechanism mounted on said reel body for reciprocating said spool axially of the spool shaft as the rotary frame rotates.

6. A spinning reel as claimed in claim 5 wherein said oscillating mechanism includes a helically grooved shaft disposed in the reel body on the opposite side of a longitudinal axis of the spool shaft from a pole mount.

7. A spinning reel as claimed in claim 1 wherein said selector control member is disposed on the opposite side an axis of the spool shaft from a pole mount.

8. A spinning reel comprising:
a reel body;
a sleeve shaft rotatably mounted on said reel body;
a rotary frame disposed forwardly of said reel body, said rotary frame being rotatable integrally with said sleeve shaft, said rotary frame having a rotational axis;
a stopper mechanism for preventing said rotary frame from rotating in a line releasing direction, said stopper mechanism including:
engaging teeth defined on an inner periphery of said rotary frame; and
an engaging pawl supported on said reel body, said engaging pawl being displaceable between an operative position engagable in said engaging teeth and a rest position to be disengaged from said engaging teeth; and
a selector mechanism for selectively operating said engaging pawl between said operative position and said rest position, said selector mechanism including:
a selector control element mounted on said reel body;
a selector control shaft shiftable by said selector control element; and
a link operating member for transmitting said shift of said selector control shaft to said engaging pawl to displace said engaging pawl to said rest position.

9. A spinning reel as claimed in claim 8, wherein said link operating member includes a first arm portion to operate said engaging pawl and a second arm portion contactable with said selector control shaft.

10. A spinning reel as claimed in claim 9, wherein said link operating member is pivotably displaceable about a pivot shaft disposed substantially between said first arm portion and said second arm portion.

11. A spinning reel as claimed in claim 10, wherein both said engaging pawl and said selector control have pivot axes parallel to said rotational axis of said rotary shaft.

12. A spinning reel as claimed in claim 11, wherein both said engaging pawl and said selector control displace substantially in a single plane.

13. A spinning reel as claimed in claim 8, wherein said stopper mechanism includes a cam member mounted on said sleeve shaft via friction, said cam member moving said engaging pawl to said rest position when said rotary frame rotates to a line winding direction.

14. A spinning reel as claimed in claim 13, wherein said cam member operates said engaging pawl through said link operating member.

15. A spinning reel as claimed in claim 13, wherein said engaging pawl includes an engageable portion, and said cam member includes an engaging portion engageable with said engageable portion, said engaging teeth moving said engaging pawl to make said engageable portion engaged with said engaging portion when said rotary frame rotates in said line winding direction.

16. A spinning reel as claimed in claim 8, wherein said engaging pawl is urged by a spring to the position engaged with said engaging teeth.

* * * * *